United States Patent [19]

Sadr

[11] Patent Number: 5,445,782
[45] Date of Patent: Aug. 29, 1995

[54] METHOD OF MOLDING MANIFOLD FOR AUTOMOTIVE VEHICLE

[75] Inventor: Changize Sadr, Toronto, Canada
[73] Assignee: ABC Group, Rexdale, Canada
[21] Appl. No.: 216,242
[22] Filed: Mar. 21, 1994

Related U.S. Application Data

[63] Continuation of Ser. No. 877,150, May 1, 1992, abandoned.

[51] Int. Cl.$^6$ ............................................. B29C 49/20
[52] U.S. Cl. .................... 264/513; 425/112; 425/525
[58] Field of Search ............ 264/513, 279, 540, 515, 264/261; 425/112, 525

[56] References Cited

U.S. PATENT DOCUMENTS

| | | | |
|---|---|---|---|
| 2,991,500 | 7/1961 | Hagen | 264/524 |
| 3,291,670 | 12/1966 | Usab | 264/540 |
| 3,496,600 | 2/1970 | Heston | 264/543 |
| 3,917,789 | 11/1975 | Heisler | 264/513 |
| 4,197,071 | 4/1980 | Salle et al. | 264/543 |
| 4,510,013 | 4/1985 | Lupke et al. | 425/393 |
| 4,752,208 | 6/1988 | Iwata et al. | 264/513 |
| 5,013,515 | 5/1991 | Aoki | 264/513 |
| 5,057,266 | 10/1991 | Belcher | 264/513 |
| 5,089,208 | 2/1992 | Nakamura et al. | 425/525 |
| 5,198,174 | 3/1993 | Nakagawa et al. | 264/513 |

FOREIGN PATENT DOCUMENTS

| | | | |
|---|---|---|---|
| 49-36947 | 10/1974 | Japan | 264/513 |
| 54-024427 | 8/1979 | Japan | 264/515 |
| 62-051426 | 3/1987 | Japan | 264/513 |
| 62-116119 | 5/1987 | Japan | 264/279 |
| 63-154335 | 6/1988 | Japan | 264/531 |
| 63-290715 | 11/1988 | Japan | 264/513 |
| 1122516 | 8/1968 | United Kingdom | 264/513 |

Primary Examiner—Catherine Timm
Attorney, Agent, or Firm—George A. Seaby

[57] ABSTRACT

In general, the molding of tubular plastic articles such as automotive inlet manifolds with flanges thereon is a difficult and expensive procedure. A simple solution to the problem is the blow molding of the tubular article in a conventional blow molding apparatus followed by the injection molding of the flange around the tubular article in a conventional injection molding apparatus. In the case of an intake manifold, the outlet ends of the manifold pipes are placed in the injection mold, which is closed to define a cavity around the ends of the pipes, and the flange is then molded onto the pipes. Preferably, the ends of the pipes are heated for the injection molding step to ensure good adhesion between the pipes and the flange.

6 Claims, 7 Drawing Sheets

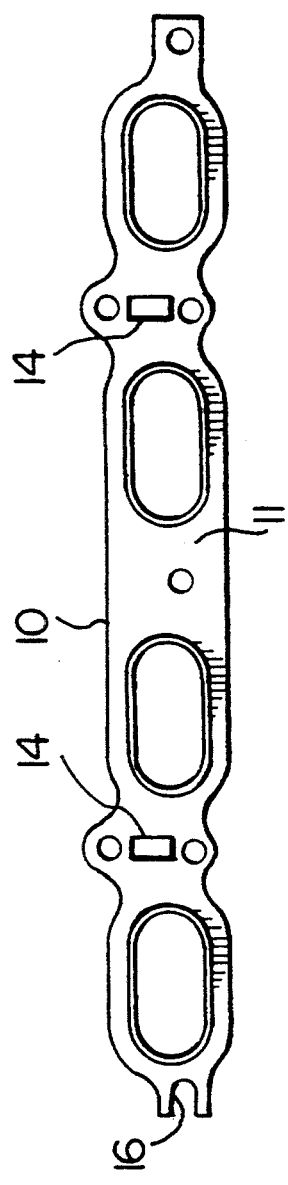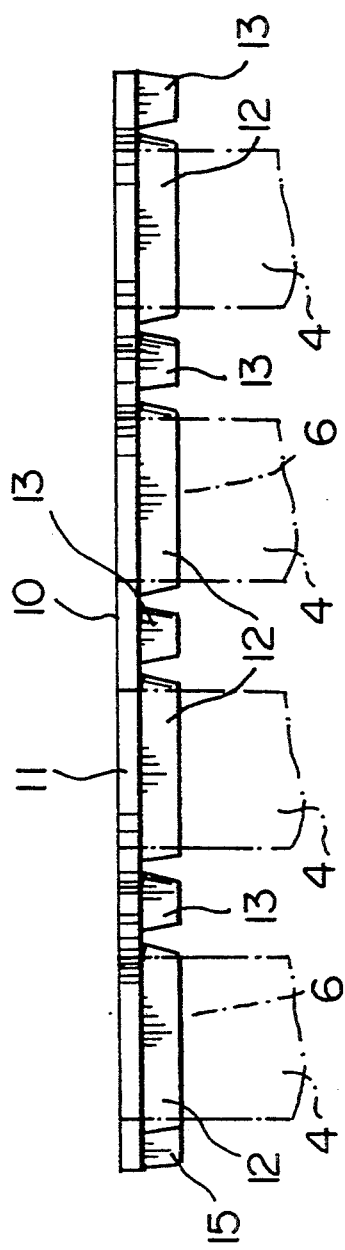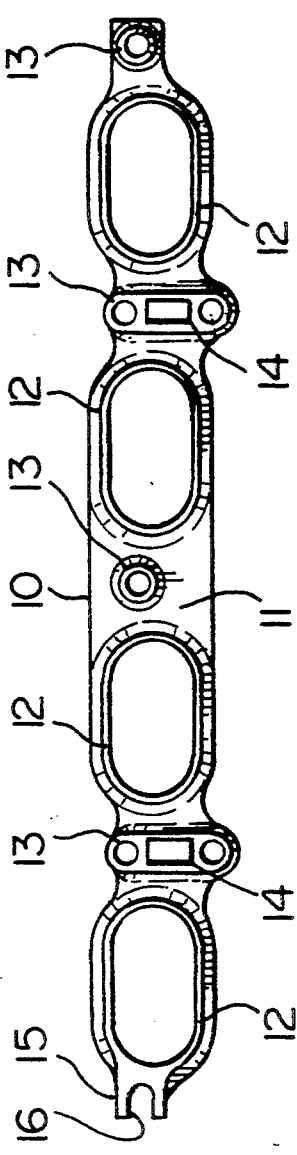

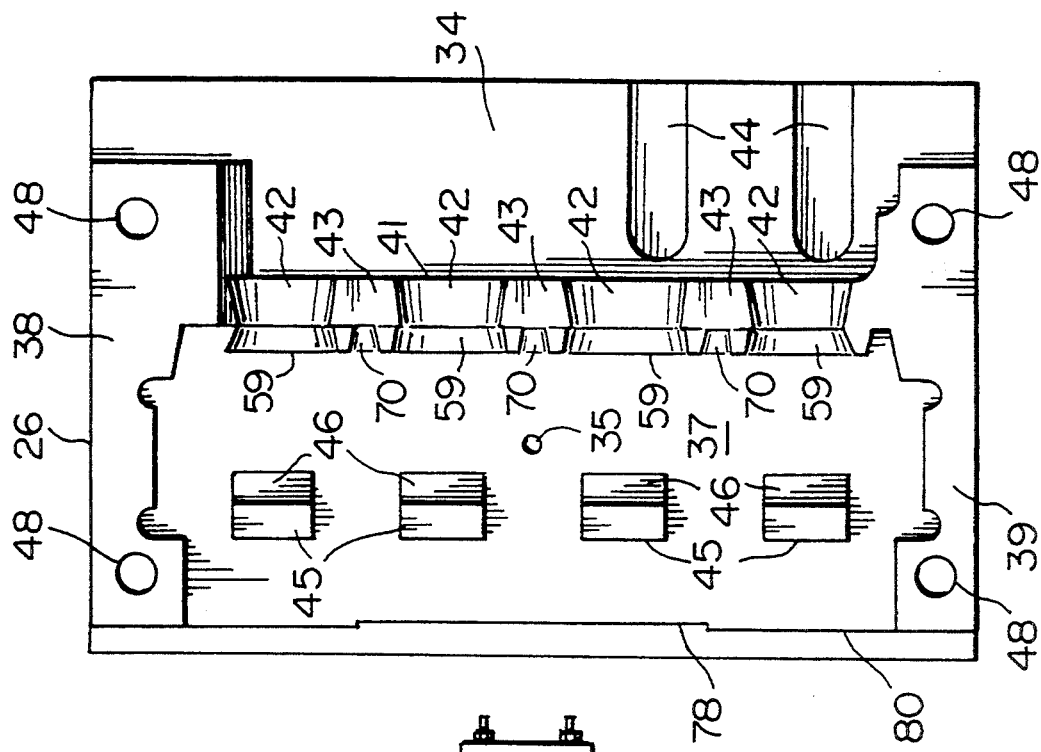
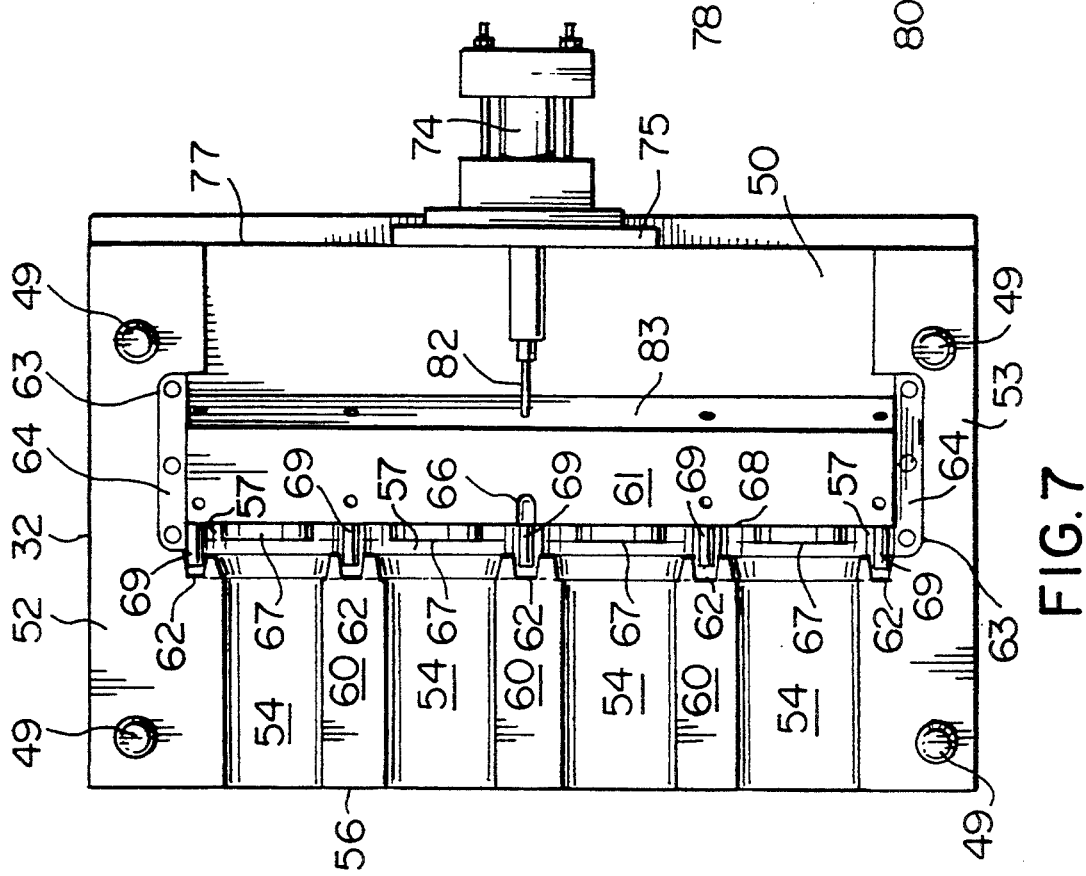

METHOD OF MOLDING MANIFOLD FOR AUTOMOTIVE VEHICLE

This application is a continuation of application Ser. No. 07/877,150 filed May 1, 1992, now abandoned.

BACKGROUND OF THE INVENTION

1. Field of the Invention

This invention relates to a mold and a method for molding a flange on a tubular article.

In more general terms, the present invention relates to a mold and a method of producing a tubular plastic article with a flange thereon. While the invention was intended for the production of an automotive air intake manifold with flanged pipes, it will be appreciated that the mold and method can be used to produce other flanged, tubular plastic articles.

2. Discussion of the Prior Art

Because of the characteristics of modern plastics, more and more automotive parts are being produced using plastic. Many parts such as tubular joint covers, dashboards and intake manifolds are produced by blow molding. An intake manifold is a relatively complicated part, including a tubular body, outlet pipes and flanges on the outer free ends of the pipes for mounting the manifold on an engine block. It is difficult to blow mold such a manifold in a single molding operation. The pipes are at an angle to the body of the manifold, and controlling the tolerances of the flanges in a blow molding step is difficult. In the past, the problem was solved by the use of a so-called "lost-core process", which involved the use of a low melting point metal insert in an injection molding method, the core being melted after molding to yield a hollow manifold. More recently, the metal has been replaced with a soluble plastic which is removed from the molded part by dissolving it with hot water. In either case, the process is complicated and expensive.

GENERAL DESCRIPTION OF THE INVENTION

The object of the present invention is to provide a solution to the above-identified problems in the form of a relatively simple method and mold for producing a flange on a tubular article, and more specifically a flange on the free ends of the pipes of a manifold.

According to one aspect the present invention relates to a method of producing a tubular plastic article with a flange thereon comprising the steps of:

(a) blow molding the tubular article from a plastic parison;

(b) forming a mold cavity around said article following the blow molding step; and (c) injecting a plastic compatible with the plastic of the tubular article into said mold cavity to form a flange around and adhering to the article.

The invention also relates to a mold for use in the injection molding of a flange on a tubular plastic article comprising a first mold half; first recess means in said first mold half for receiving said plastic article and defining part of a mold cavity; a second mold half; second recess means in such second mold half for receiving said plastic article and defining part of the mold cavity; slide means mounted in said second mold half between a closed position defining the remainder of the mold cavity and an open position for releasing a molded flange; cylinder means for moving said slide means; and latch means for releasably locking said slide means in the closed position when the mold halves are moved together to a closed position.

BRIEF DESCRIPTION OF THE DRAWINGS

The invention will now be described in greater detail with reference to the accompanying drawings, which illustrate an apparatus for carrying out the method of the present invention, and wherein:

FIG. 1 is a front view of a manifold flange produced in accordance with the present invention;

FIG. 2 is a top view of the flange of FIG. 1;

FIG. 3 is a rear view of the flange of FIG. 1;

FIG. 6 is a front view of a mold half used in the mold of FIG. 5;

FIG. 7 is a front view of the other mold half of FIG. 5;

DESCRIPTION OF PREFERRED EMBODIMENT

Figure 4:
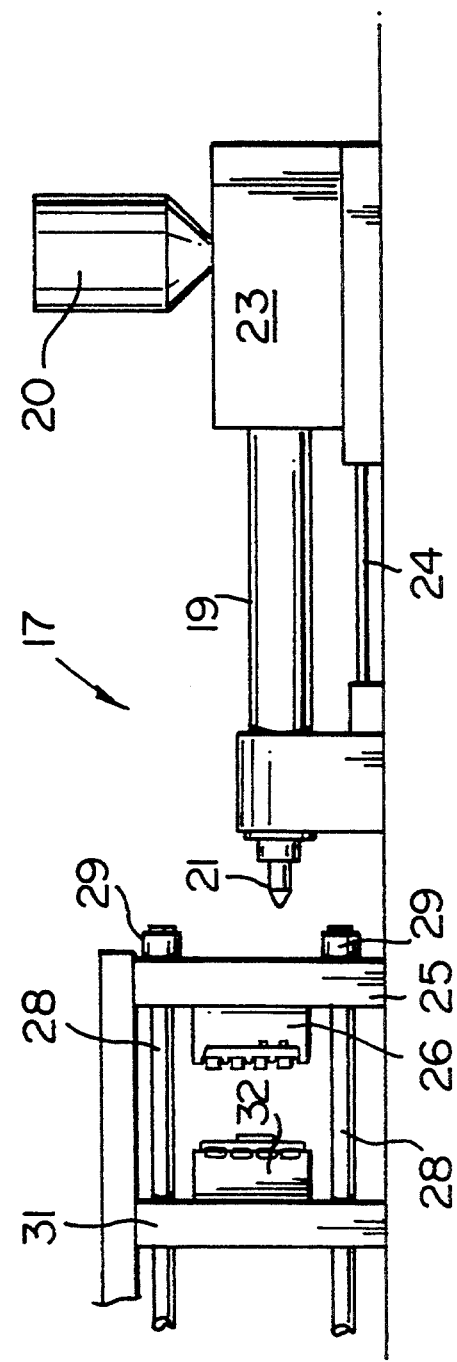
FIG. 4 is a schematic side view of a molding machine for carrying out the method of the present invention.

The first step in producing an intake manifold generally indicated at 1 (FIGS. 3 and 10) involves the blow molding of the manifold using a conventional blow molding apparatus. The manifold 1 includes an elongated tubular body 2 with an inlet pipe 3 on one end and a plurality of outlet fingers or pipes 4 in one side thereof. During blow molding, the outer ends 6 of the pipes 4 are closed, i.e. the pipes 4 formed during blow molding have closed outer, outlet ends 6. Annular ridges 7 (FIG. 10) are provided on the outer free ends 6 of the pipe 4. Also during blow molding, lugs (not shown) are molded integral with the body 2 and the pipes 4 for facilitating the mounting of hoses and/or wires on the manifold.

With reference to FIGS. 1 to 3, the method of the present invention is intended to mold a mounting flange 10 (FIGS. 2 to 4) on the outlet ends 6 of the manifold pipes 4. The flange 10 is defined by an elongated, planar body 11 with four short elliptical cross section sleeves 12 extending outwardly for mounting the flange on the ends 6 of the pipes 4. Tubular lugs 13, extend outwardly form the same side of the body 11 for receiving bolts (not shown) for mounting the manifold on an engine. Some of the lugs contain central, rectangular cross section holes 14. On one end the lug 15 includes a bolt receiving notch 16. In accordance with the method of the present invention, the flange 10 is molded and mounted on the pipes 4 in a single injection molding operation.

Figure 5:
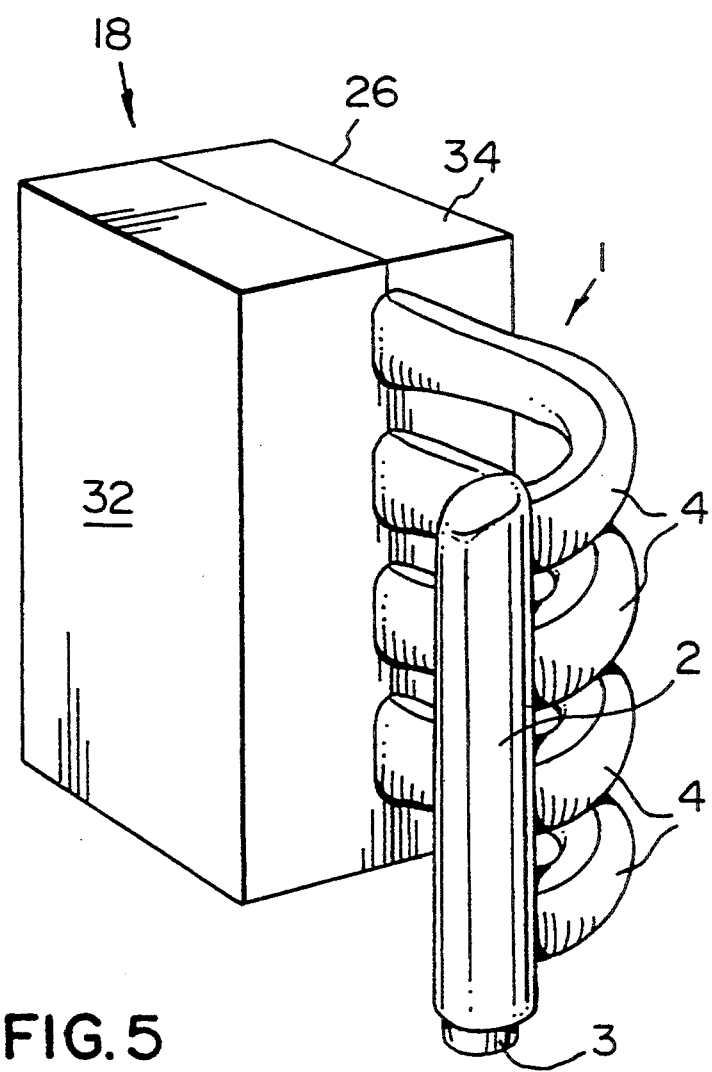
FIG. 5 is a perspective view from above of a mold used in the machine of FIG. 4 in the closed position and carrying a manifold.
Figure 8:
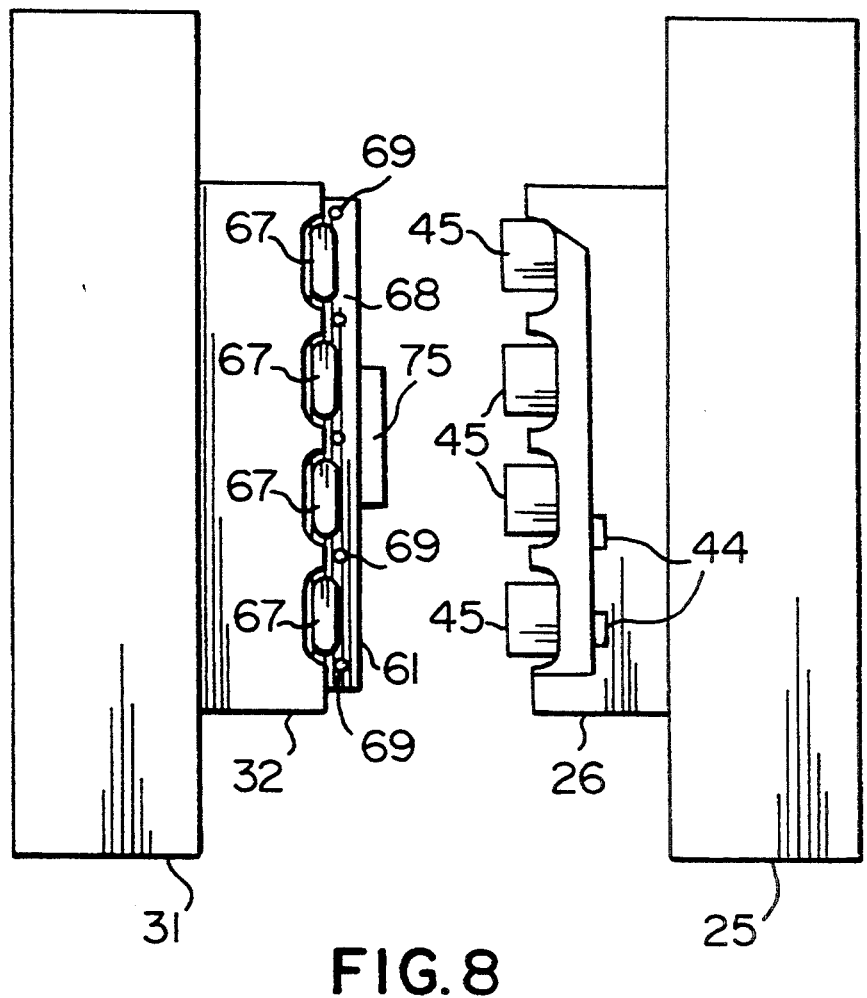
FIG. 8 is a schematic, side view of mold halves and platens used in the molding machine of FIG. 4.

The molding operation is performed using the conventional molding apparatus 17 partially illustrated in FIG. 4, and a mold generally indicated at 18 (FIGS. 5 to 10) in accordance with the present invention. The molding apparatus 17 includes a heated extruder barrel 19 for receiving a plastic (in this case a glass reinforced nylon) from a hopper 20. The heated plastic is forced through an injection nozzle 1, at the outer end of the extruder 19. The extruder body 23 is slidably mounted on shafts 24 for movement towards and away from a fixed rectangular mandrel 25, which supports one mold half 26. Four shafts 28 (two shown) extend through the corners of the mandrel 25. One end of each shaft 28 is fixedly mounted in a sleeve 29 on the outside of the mandrel 25, and the other end of each shaft is supported by the molding machine frame. A second mandrel 31, which supports a second mold half 32 is slidably mounted on the shafts 28 for movement towards and away from the mandrel 26. The extruder body 23 and the mandrel 31 are moved by hydraulic cylinders (not shown). Movement of the mold halves 26 and 32 to a closed position (FIG. 5) forms a mold with a cavity in the shape of the flange 10 for receiving plastic from the extruder barrel 19.

As best shown in FIG. 6, the mold half 26 includes a rectangular body 34 with an injection orifice 35 extending therethrough for receiving fused or molten plastic from the head 21 of the extruder 17. The inner surface 37 of the body 34 is planar with top and bottom shoulders 38 and 39, respectively joined by a vertical projection 41. Concave troughs or grooves 42 separated by lands 43 are provided in the projection 41 for receiving the pipes 4 of the manifold 1. Elongated, generally U-shaped recesses 44 are provided in one side edge of the body 34 for receiving two of the pipes 4, i.e. for permitting full closing of the mold 18. Four posts 45 with one bevelled side 46 extend outwardly from the surface 37. Holes 48 are provided in the corners of the ends 38 and 39 for receiving aligning pins 49 near the corners of the other mold halve 32. The holes 48 and the pins 49 ensure that the mold halves 26 and 32 are precisely aligned in the closed 20 position.

Referring to FIG. 7, the other mold half 32 includes a rectangular body 50 with raised top and bottom shoulders 52 and 53, respectively for abutting the shoulders 38 and 39 of the mold half 26. Four elongated concave recesses 54 extend inwardly from one side 56 of the body 50 for receiving the pipes 4 of the manifold 1. The inner ends 57 of the recesses 54 cooperate with flaring ends 59 of the recesses 44 (FIG. 6) to define the parts of a mold cavity in which the sleeves 12 are formed. When the mold is closed, the lands 60 between the recesses 54 abut the lands 43 between the recesses 44. The lugs 14 are formed by opposed small recesses 62 in the inner ends of the lands 60 and in the shoulders 52.

A slide 61 is mounted on the inner surface of the body. The ends of the slide 61 extend into grooves 63 in the ends 52 and 53 of the body 50. The slide shoulders are slotted for sliding on plates 64. An arcuate groove 66 in the slide 61 receives plastic from the orifice 35 and feeds it to the mold cavity. Oval cross section projections 67 on one planar side 68 of the slide 61 receive the open ends 6 of the manifold pipes 4 for centering the manifold in the mold. Pins 69 on each side of the projections 67 enter recesses 70 and 62 in the inner ends of the lands 43 and 60, respectively for forming the holes through the tubular lugs 13, the holes 14, and the groove 16 in the lug 15 (only the outermost pins 69 are shown, the others being aligned therewith on the planar side 68 of the slide 61).

The slide 61 is moved from an open position (to the right in FIG. 7) to a closed position (to the left in FIG. 7) in which the free ends of the pins 69 engage the inner ends of the recesses 70 and 62 by a hydraulic cylinder 74. The cylinder 74 is mounted on a plate 75 which is bolted to side 77 of the mold half 32. During closing of the mold, the plate 75 enters a shallow recess 78 in the side 80 of the mold half 26. A piston rod 82 extends through the plate 75 into an inclined or bevelled side 83 of the slide 61. When the mold halves are abutting, i.e. when the mold is closed, the bevelled sides 46 of the posts 45 abut the bevelled side 83 of the slide 61 for holding the latter in the closed position.

Figure 9:
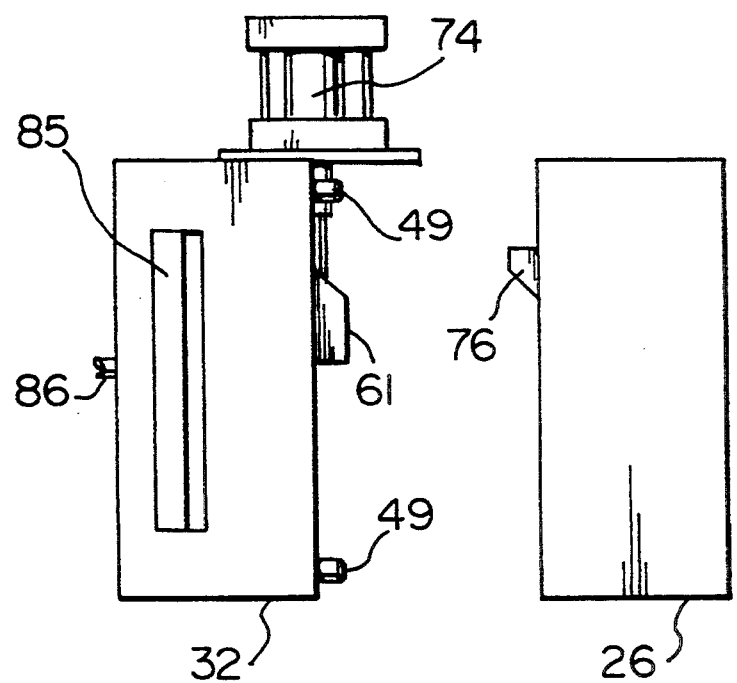
FIG. 9 is a top view of the mold halves of FIG. 8.
Figure 10:
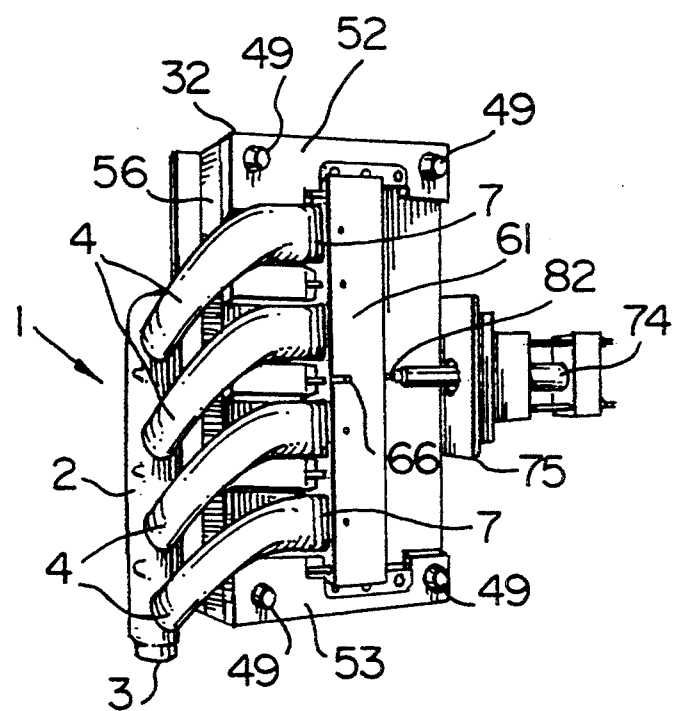
FIG. 10 is a schematic, perspective view of the mold half of FIG. 6 with a manifold mounted thereon.

During production of a flanged manifold, with the mold open, a blow molded manifold is placed on the mold half 32 (FIG. 10). Before placing the pipes 4 in the mold, the closed ends 6 of the pipes 4 are open (i.e. the closed ends are removed following molding). The slide 61 is moved to the closed position by actuating the cylinder 74, whereby the projections 67 enter the open ends 6 of the pipes 4 to center the manifold in the mold. The mold is closed (FIG. 5) by moving the mold half 32 against the mold half 26 to define a mold cavity around the ends 6 of the pipes 4. The plastic material (glass filled nylon) is injected from the extruder 17 through the orifice 35 into the mold cavity to produce a flange 10 on the ends 6 of the pipes 4. The ridges 7 help to anchor the flange 10 on the pipes. The mold is then opened and the completed part removed. For such purpose fingers (not shown) are provided in the mold half 32. The fingers are normally retracted. Referring to FIG. 9, the fingers are mounted in a plate 85 extending the length of the mold half 32. A piston rod 86, extending through the back of the mold half 32, is reciprocated by a hydraulic cylinder (not shown) to extend and retract the pins. Following opening of the mold, the piston rod 82 is retracted to move the slide 61 away from the molded flange, and the fingers are extended to eject the part.

As mentioned above, the outer free ends 6 of the pipes 4 produced by blow molding are closed. It will be appreciated that by making relatively minor variations to the mold halves, a flange 10 can be molded onto closed pipes 4, and the pipes can then be cut to open the outer ends thereof. It will also be appreciated that while (in the present case) the manifold pipes and the flange are formed of the same plastic, the material used in the two elements could be different, provided the materials are compatible, i.e. will stick together to form, in effect, a one-piece finished product.

It will be appreciated that by making suitable alterations to the blow molding machine, it is possible to carry out the two molding steps in a single apparatus. In such a method, the manifold is blow molded in a blow molding machine, a mold cavity is then, formed around the ends of the free ends of the manifold pipes, and the plastic for forming the flange is injected into the mold cavity. The use of this method eliminates some secondary and manual operations, and increases cycle time and efficiency.

I claim:

1. A method of molding an air intake manifold for an internal combustion engine, wherein the manifold includes an elongated hollow body, a plurality of pipes extending outwardly from one side of said body, said pipes having open outer ends, a mounting flange on the outer open ends of said pipes, the flange including a sleeve on the outer end of each said pipe and an elongated planar body integral with and extending between the sleeves, the planar body surrounding the open ends of the sleeves for mounting the manifold on an engine, the method comprising the steps of blow molding the hollow body and pipes from a plastic parison in a first mold, the pipes having closed outer ends following the blow molding step; opening the closed ends of the pipes; placing the pipes in an open second mold including (i) first and second mold halves containing recesses for defining a mold cavity around the free ends of all of the pipes, in the area between the free ends and beyond the free end of each said pipe, (ii) a slide and (iii) projections on said slide for receiving the open ends of said pipes; moving the slide to a closed position; inserting the projections into the open ends of the pipes to center the pipes in the mold; and closing the second mold by moving the mold halves together, whereby the mold halves and the slide define the mold cavity around the free ends of the pipes; injecting a plastic compatible with the plastic of the manifold into the mold cavity to form a continuous flange around and adhering to the pipes; and opening the mold by moving said mold halves apart and sliding said slide to an open position allowing removal of the thus completed manifold from the second mold.

2. A method according to claim 1, including the step of heating said pipes before injecting the plastic into the mold cavity to promote bonding between the pipes and the flange.

3. A method according to claim 2, wherein the pipes are heated before being placed in the open second mold.

4. A method according to claim 1, wherein the manifold and flange are both formed of the same glass filled nylon.

5. A method according to claim 1, including the step of molding tubular lugs integral with said planar body means for receiving engine bolts using pin means on said slide means extending into said mold cavity when the second mold is closed.

6. A method according to claim 5, including the step of forming annular ridges on the outer ends of said pipes for aiding in the anchoring of the flange sleeves on the pipes.

* * * * *